3,124,529
PROCESS FOR THE TREATMENT OF FLUIDS WITH CARBON
Pieter Smit, Santpoort, Netherlands, assignor to N.V. Octrooien Maatschappij Activit, Amsterdam, Netherlands, a limited-liability company of the Netherlands
No Drawing. Filed Mar. 17, 1960, Ser. No. 15,556
Claims priority, application Netherlands Mar. 17, 1959
1 Claim. (Cl. 210—39)

The invention relates generally to a process for the treatment of liquid or gaseous fluids with carbon. Such fluids may have solid materials dispersed therein, and the carbon used is usually the residue of a decomposition of organic material.

The treatment of fluids with such carbon-species is known, e.g. for decolorizing, catalyzing special reactions, ionexchanging etc. Often such carbon is referred to as "activated carbon."

The present invention involves the treatment of fluids with a carbon which has been obtained from the partial combustion of hydrocarbons with oxygen during the production of combustible or synthesis gas.

Such partial combustion of hydrocarbons results in combustible gases and solid carbon in extremely finely divided condition originates which has heretofore been usually considered an undesired by-product. The use of this so-called "carbon black" has been suggested in printing-ink, and in the manufacturing of rubber tires etc. It has also been proposed for use in place of activated carbon, but it has never been practically applied as such.

The manufacturing of carbon black from liquid and gaseous organic material is known. Lately carbon black has also been prepared from mineral oils particularly in high yields. Therefore carbon black has become an easily accessible starting material for various processes. As already mentioned above it has been proposed to use carbon black instead of activated carbon, however, up till now these attempts have had little success. As an adsorbent, for instance, it is considerably inferior to the commercial products obtained in the usual way. In itself it is not surprising, as the commercial activated carbon consists of minuscule fragments of irregular form, whereas carbon black has a chiefly globular form of considerably smaller particles. Furthermore carbon black is more or less highly hydrophobic and activated carbon is hydrophilic. This hydrophobic property of carbon black is sometimes ascribed to a definite oil content resulting from the starting material from which the carbon black was prepared, but it is a fact that carbon black which is absolutely free from oil has a similar hydrophobic character. There are other apparent differences between both kinds of material; while carbon black feels "greasy," activated carbon feels "dry"; the former product attaches itself obstinately to various surfaces such as, for instance, the skin, and can only be removed with soap or another detergent, while this is much less the case with the latter product.

If the products are mixed with water, for instance up to a 5% dispersion, and then are filtered through an ordinary vacuum-filter of coarse structure, the carbon black suspension gives a small amount of turbid filtrate and clogs the filter quickly, while the suspension of activated carbon gives a perfectly clear filtrate almost immediately and does not clog the filter. For this reason carbon black has been estimated as being useless for the applications for which activated carbon is used. Furthermore the decolorizing effect of carbon black on a sugar-solution is much less than that of activated carbon. Furthermore carbon black is extremely suitable for the preparation of printing ink in contrast with activated carbon. Up till now all this has led to the conclusion that activated carbon and carbon black each have separate areas of application area and cannot be substituted for each other.

Given the fact that some starting materials for the manufacturing of carbon black, such as, mineral oils or organic gases, are much more easily and cheaply accessible than those for the preparation of activated carbon, it is economically advantageous to substitute carbon black for activated carbon, for example, as a decolorizing agent.

It has been found now that a particular carbon black can be employed as a decolorizing agent, which carbon black is equal to or even excels activated carbon in its decolorizing capacity, in spite of the form and the extreme fineness of the particles, which had heretofore been considered unacceptable obstacles to filtration. Moreover this particular carbon black is almost free of ashes contrary to the commercial activated carbon.

To obtain a suitable carbonaceous product hydrocarbons, either in a gaseous or in a liquid phase, are submitted to a partial combustion with oxygen so that a carbon black comes into being that is suitable for adsorption purposes in general and for decolorizing in particular, in that it has a great surface and a more hydrophilic character. Generally speaking the carbonaceous product is composed of small particles which usually are less than 50 mmicron, and preferably under 4 mmicron. The surface per gram is at least 300 m.$^2$, but can also be more than 1000 m.$^2$. This surface is found by nitrogen-adsorption according to the Brunauer Emmet Teller method. Which surface is chosen, depends upon the proposed use. If substantial decolorisation is desired, the surface area has to be much larger than, for instance, when the carbonaceous material is used as a filteraid.

Generally speaking the carbonaceous product is very pure and is practically free from tarry or volatile components; the main component apart from carbon is oxygen. The contents of oxygen can be up to 20%. The yield of carbonaceous material with a high decolorizing power is smaller than that of a material suitable for filtration purposes; it varies between 3–20%.

To manufacture a carbonaceous material which is extremely suitable as an adsorption agent, the partial combustion has to be conducted so that there is hardly any more methane present in the combustion gases. When manufacturing carbon black in the conventional way methane is usually present in amounts of at least 5% of the combustible gas obtained. Other characteristics of the product are that it has a high real specific gravity, which generally surpasses 1.9. When extracting with benzene hardly any extract is obtained, while the particle size is very small. However, the particles tend to clot.

Generally it is desirable to have the reaction proceed at a high temperature, for instance at least 1000° C., and also at a high pressure, even up to 40 atmospheres, in order to give the reaction gases a considerable caloric value. Usually the adding of large amounts of steam or water during the combustion has a favorable influence. On account of their high pressures, the gases thus obtained can serve, after cooling, as city gas and can be transported through pipe-lines over large distances. The compression of the final product which is necessary in other cases is disposed of in this way.

Further it is advantageous that the combustion be accomplished in a very short time as if it were an explosive combustion. It is desirable to have a continuous process and have it absolutely ended within 30 seconds, in order to obtain both a good product and a proper yield of carbonaceous material. It is also desired that the reaction take place at at least 1000° C., and even temperatures up to 3000° C. are advantageous.

In connection with the foregoing an efficient spraying or vaporizing of the material and mixing thereof with the oxygen is very important. It is also of advantage to preheat the components taking part in the reaction. In doing this one can even go to temperatures of 300–500° C.

It is often very appropriate to use pure oxygen or air mixed with oxygen for the reaction, in order to obtain a gas with a higher combustion value after the reaction, or a gas suitable to serve as a synthesis-gas for instance in the manufacture of synthetic ammonia.

Finally it is often desired to have the reaction proceeded under high pressure, at least over 2 atmospheres. This pressure can even be some decades of atmospheres.

The reaction temperature in itself, provided it is over 1000° C., is not critical. Over for instance 1700° C. one can generally speaking shorten the reaction time.

The preheating temperatures depend on the quality of the adsorbent to be prepared, on the heating time, on the apparent oxidation grade of the organic fluids, on the composition of these organic fluids, and on many other factors. As concerns the preheating temperature, it can be said that, in general, it is not necessary to preheat over 600° C. Furthermore it is recommened not to increase the yield of carbonaceous material too highly, contrary to the procedure in the normal manufacturing of carbon black, as a high yield is attended by poor quality. Therefore, it is desirable to maintain the yield below 10 percent, calculated on the starting material.

The starting material may consist of various different hydrocarbons, both gaseous, liquid and solid, such as, coal gas, natural gas, mineral oil, light and heavy fuel oil, crude mineral oil, tar, asphalt, by-products of the manufacturing of gas and coal etc. Before describing the use of suitable carbonaceous materials, a few examples will be given illustrating their manufacture.

The partial combustion may be accomplished with the aid of a catalyst.

To be suitable for use in the process according to the present invention, the carbonaceous material may be subjected to either dry or wet separation, in the former case with aid of cyclones and/or dust filters, in the latter case by injecting water into the mixture of gas and carbon after the reaction. Afterwards one can separate a paste with a very high water content by filtering the suspension, for instance, through a continuously working filter. This content of water can amount up to 93% and can hardly be separated from the paste by squeezing. According to the invention one can however remove a large percentage of the water by electro-osmosis.

*Example 1*

Heavy fuel oil with a specific gravity of 0.96 and a viscosity (determined according to the method of Redwood) of 2700 sec. at 35° C., is partially oxidized with 0.74 Nm.$^3$ of pure oxygen per kg. of oil, while adding 0.35 kg. of steam, which components are all preheated up to 290° C. in a reaction vessel. From the discharging gas flow the carbon is precipitated with water in a yield of 0.04 kg. per kg. of oil, calculated on dry material.

*Example 2*

The reaction of Example 1 is conducted under a pressure of 15 atmospheres. Again about 0.04 kg. of carbon per kg. of oil is obtained, calculated on dry material.

*Example 3*

Following the procedure in Example 1, with the exception that 0.8 Nm.$^3$ of oxygen and 0.4 kg. of steam per kg. of oil are used after being preheated to 350° C. Now about 0.036 kg. of carbon per kg. of raw material is obtained, calculated on dry material.

*Example 4*

Heavy fuel oil is vaporized or sprayed and preheated to 300° C., and after mixing with water vapor, is oxidized with oxygen preheated up to 200° C. in an amount that does not surpass 0.8 Nm.$^3$/kg. of fuel oil with about the same amount of water vapour being used. Here the ratio of the reactants is such that the gas contains very little or no methane after the reaction which is ended within 10 seconds. The gas obtained can be used for city service-gas. The carbon that is separated has a surface of 900 m.$^2$ per gram.

*Example 5*

Prior to being reacted, fuel oil and oxygen are brought to a pressure of 20 atmospheres and preheated up to 300° C. During the reaction a temperature of 1700° C. is maintained. The separated carbon has a surface of 1150 m.$^3$ per gram. The gas obtained after the reaction contains about 50% hydrogen and is suitable as a synthesis gas for the synthesis of ammonia.

*Example 6*

In the process according to Example 2, the carbon is not separated by a dry procedure but with the aid of water. Pure water must be used for this purpose and is preferably circulated as much as possible.

*Example 7*

The wet carbon black paste with 93% contents of water, separated according to Example 6 with the aid of filters, is submitted to electro-osmosis. The carbon black paste is applied in a layer of 20–25 mm. thickness on a gauze having 3 mm. mesh. A conductive plate is placed on the mass and this plate is connected with the positive pole of a direct current source, while the gauze is connected with the negative pole. During five hours a current is led through the paste at a voltage difference between the two poles of 2½ to 3 volts. The water content of the paste is reduced in such a way that 65–75% of the water has been eliminated. By this treatment the carbon black is baked together into solid particles which eventually can be easily dried.

In accordance with the invention, the carbonaceous materials produced as above are employed mainly in the following areas:

(a) Decolorizing
(b) Ion-exchanging
(c) Catalysis
(d) Adsorption in general

It is known that the decolorizing of substances, particularly of liquids in general, is not always achievable with the same decolorizing agents. Inorganic powdery materials are often used for decolorizing oils, e.g. activated or non-activated earths, aluminium compounds, silicates etc. Water containing liquids are decolorized by activated carbon, decolorizing resins etc. However, different oils or watery liquids can be decolorized by only a few inorganic materials or activated carbon specimens.

Often it is advantageous to use mixtures of these decolorizing agents or to apply them in series. A good decolorizing capacity of the material is however not yet a guarantee that the material is also practicaly usable. It can for instance cause insuperable difficulties during actual use, for example, by clogging of the filter presses or the like. The use of the described carbonaceous materials as decolorizing agents, which are adapted to the application purpose, offers a big economic advantage.

It was found that the abovementioned carbonaceous products often have a high cation-exchanging capacity, because of their enormously accessible surfaces, which are loaded with the suitable polar groups. Of the present products these are mostly weakly acidic groups, so that these have a strongly selective character. Besides the present products can be easily granulated or pelleted, whereby granules or pellets are obtained which, after drying or soft calcining, are sufficiently resistant, particularly after a preceding mixing with a binder. Grain-shaped weakly acidic ion-exchangers have a large and important field of application. It is important that these should be used and regenerated again and again, which can be done with the products treated according to the process of the invention.

It has also been found that the carbonaceous products also have good catalytic properties on account of their favourable structure. The present products are also of importance for the manufacturing of dry elements.

Next to the general adsorption exercised in liquids the products are also extremely usable for the adsorption of gases. An important application is the adsorption of materials that are responsible for the smell and/or taste, e.g. in the case of bad tasting drinking water.

In addition to the use in decolorizing and adsorption of the products obtained according to the invention as substitues for normal activated carbon or adsorbing resins, there are applications of the invention for which the latter cannot be used, either because the same result cannot be achieved or is only achieved uneconomically on account of an insufficient adsorption capacity. This is particularly true of the decolorization of oils and of sugar juices and syrups. Furthermore, for the removal of adverse smells and tastes the adsorbents obtained in accordance with the invention are in general unsurpassed. There are however cases in which the carbonaceous materials have to be applied in a special way to reach the maximum results. In some liquides, e.g. in water, the carbonaceous materials are difficult to divide and show a tendency to clot, so that the adsorption characteristics are not used to full advantage.

According to the invention emulsifying agents can be added to the liquid to act as wetting agents which accomplish the extremely fine division of the carbonaceous material. The kind of emulsifying agent and what amount thereof is most suitable have to be experimentally determined. Care has to be exercised to avoid any toxicity resulting from the addition of the wetting agent. The products can be either ionogenic or non-ionogenic. Often soluble phosphates or even alkalis are usable. The best results are obtained with substances based on sorbitol, saccharose-ester or fatty alcohol.

It has been found during the use of the carbonaceous products as adsorption and decolorizing agents that the filtration can cause difficulties on account of the finer division of the material, especially if the liquid has a high viscosity or solid content. It then may be necessary to employ a filter aid besides the carbonaceous product. In other cases it is even possible that the function of the filter aid is taken over by carbon black with a larger particle size of at least 50 millimicron.

In dry condition or in a condition in which the product, obtained by partial combustion with oxygen, still acts as a fluid, it is very voluminous, which can lead to difficulties, particularly during transport or use. The product is however easily transformed into a less voluminous form by uniting the loose carbon particles into bigger agglomerates under pressure, e.g. into pellets or granules. Rolling of the vessel in which the product is present is sufficient for effecting this agglomeration, and adding of a suitable liquid, solid or even sometimes of gas, is beneficial to this agglomeration. The liquid can be water, or a liquid which does not cause disadvantages when using the carbon, for example, a liquid having the same compositions as the medium that must be purified, or a liquid that acts as the desired emulsifying or wetting agent.

CaO powder can be mentioned as being a suitable solid for effecting agglomeration of the carbonaceous material without hindering the use of the latter. Furthermore, other adsorbents, decolorizing earth, the reaction product of strong sulphuric acid and carbon containing material (Collactivit), crushed "decomposer cokes" of "acid sludge" and the like can be used.

A very suitable gaseous addition is $SO_2$ which can be used instead of $H_2SO_4$ solutions. The abovementioned additions must be well mixed with the carbonaceous product, particularly if the product has to be agglomerated.

According to the invention the carbonaceous product is particularly advantageous in the sugar-industry, if insoluble Ca-compounds are formed also in the liquid to the treated or if these are added to the liquid. The use of a special kind of filter aid is therefore entirely superfluous. In particular the use of $CaSO_4$, $CaSO_3$ and $CaCO_3$ give good results which far surpass the adsorption effect of the carbon and of these calcium-salts alone.

It has been found that no difficulties at all are encountered if one filters through a filter medium, even when the carbonaceous product is not pelleted or granulated. In this filter the liquid flow is led in an upward direction through a granular material of for instance sand or finely ground coal. The carbonaceous product is then fixed on the surface of these particles, without causing loss of pressure.

The following are examples of the use of the carbonaceous product obtained from the partial combustion of a hydrocarbon with oxygen:

*Example 8*

The carbonaceous product obtained according to Examples 1 and 5 were examined for their decolorizing properties by treating refined Cuban crude sugar solution therewith.

This solution had a strength of 61 Bx and a temperature of 70° C., while the duration of contact with the carbonaceous product was 20 minutes. So as to provide a basis for comparison, an experiment was simultaneously conducted under the same circumstances as much as possible, but using an activated coal of good quality. The results obtained are given in the following table, in which the numbers 1 and 5 indicate the decolorizing agents according to the Examples 1 and 5, while the number 4 indicates one of the best specimens of activated commercial coal.

| Addition solid material on solid material | Decolorization in percent | | | Rest-colour in percent | | |
|---|---|---|---|---|---|---|
| | 1 | 5 | 4 act. coal | 1 | 5 | 4 act. coal |
| 0.2% | 31 | 35 | 33 | 69 | 65 | 67 |
| 0.6% | 65 | 70 | 68 | 35 | 30 | 32 |
| 2% | 94 | 96 | 92 | 6 | 4 | 8 |

*Example 9*

Cuban crude sugar is dissolved in water up to 60° Brix, brought up to 90° C. and mixed with 1% of the carbonaceous product manufactured according to Example 5. After 15 minutes contacting time the solution is filtered through a filterpress: The filtrate is brilliant and decolorized down to 40%. If the experiment is repeated with a good commercial quality of activated carbon, the decolorization turns out to be not more than down to 60%, only the filtration takes place more quickly.

*Example 10*

River water, which has a bad taste and smell by reason of contamination with industrial impurities is mixed with 6 mg. of the carbonaceous product manufactured according to Example 3, per liter and thereafter filtered. The bad smell and taste are absolutely gone.

However, in this example it is necessary to add 20 grams of Berol EMU 07 per 100 grams of carbonaceous product in the suspension so that such addition will act as an emulsifying agent on a fatty alcohol basis.

The carbonaceous products referred to above can be used for many liquids besides the ones mentioned in Examples 8, 9 and 10, such as other watery liquids, and oils and fats of vegetable, animal, mineral and synthetic origin. More particularly, such carbonaceous products can be used with very good results for carbohydrate containing liquids in general, such as saccharose-, glucose-, maltose-containing liquids, for sorbitol-containing solutions, solutions of protein derivates, amino-acids and the like of organic acids and salts, of glycerol, furthermore of olive-, castor-, peanut-, cocoa-, maize-oil, fish-oil etc., organic liquids such as aldehydes, alcohols etc. In watery solutions the carbonaceous product may exert a buffering action in addittion to a decolorizing action and adsorption in general. For this purpose the carbonaceous product can be loaded with the suitable cations in an efficient way. In the case of oils and fats, the described carbonaceous product can be applied exclusively or mixed with a far smaller quantity of inorganic adsorbents than is necessary when using activated carbon.

Although several specific examples of the invention have been referred to herein as being illustrative of the invention, it is to be understood that the latter is not limited to those specific examples, and that various changes and modifications may be effected therein without departing from the scope or spirit of the invention except as defined in the appended claim.

What I claim is:

A process of decolorizing aqueous solutions which consists essentially of contacting the solution with the particular carbon black resulting from the partial combustion of a hydrocarbon with oxygen during production of a combustible gas, said hydrocarbon and oxygen being preheated to at least approximately 200° C., and said partial combustion being conducted at a temperature of a least 1000° C. and under a pressure of at least 2 atmospheres.

References Cited in the file of this patent

UNITED STATES PATENTS

| | | |
|---|---|---|
| 2,008,145 | Morrell | July 16, 1935 |
| 2,317,026 | Brown et al. | Apr. 20, 1943 |
| 2,623,811 | Williams | Dec. 30, 1952 |
| 2,707,674 | Sweitzer | May 3, 1955 |
| 2,779,664 | Sweitzer | Jan. 29, 1957 |